(12) United States Patent
Williams

(10) Patent No.: X9370
(45) Date of Patent: Feb. 5, 1836

(54) TANNING, BARK FOR

(76) Inventor: Daniel Williams

Daniel Williams of Boston Mass.

Letters Patent.

The Schedule referred to in these Letters Patent and
making part of the same containing a description in the
words of the said Daniel Williams himself of his improve
=ment in the process of Preparing Bark and obtaining the
extract therefrom To all to whom these presents shall come.
Be it known that I Daniel Williams of Boston in the County
of Suffolk and Commonwealth of Massachusetts have invented
or discovered a new and useful improvement in the process
of preparing bark and obtaining the extract therefrom
for tanning for coulouring and for other purposes, and
that the following is a full and exact description thereof.
First. the hemlock oak or other bark from which the
extract is to be made is divested of its outer part or ross
either by shaving or cutting it off by hand or by the assis-
tance of a machine constructed for the purpose.
Second, the inner part of the bark after being divested
of the outer part or ross is cut into small pieces the tanning or
colouring principle is then extracted from the bark so cut in
pieces as aforesaid by leaching the same with hot water or by
steam. From the liquor thus obtained the water is evaporated
by boiling or by the sun and then the extract or gum is fit for use.
What I claim as my invention or improvement in the
above described process of preparing the extract from bark
and not previously known or used is the method of preparing
the bark by cutting the same into pieces before leaching instead
of pulverizing or grinding as has heretofore been prac-
tised or in other words preparing the extract from bark
that that is cut into pieces instead of from that which is ground or pulverised as has been heretofore practised The advantages of this method over the common method of grinding or pulverising are that all the dust and minute particles which are produced by grinding or pulverising and which get into the extract prepared from pulverized bark and injure it are avoided and consequently the extract or gum which is obtained by the process as above described possesses a clearness and purity which renders its value far greater than any which can be obtained by any previously discovered method.

In Testimony that the above is a true Specification of my said improvement as above described, I have hereto set my hand this thirtieth day of November in the year of our Lord one thousand eight hundred and thirty five.

Witnesses
Wilder S. Thurston
Austin Field

Daniel Williams

Drawing